United States Patent
Slater et al.

(10) Patent No.: US 7,561,399 B2
(45) Date of Patent: Jul. 14, 2009

(54) EXCESSIVE SURGE PROTECTION METHOD AND APPARATUS

(75) Inventors: Byron Slater, Lafayette, IN (US); Saieb Alrawi, West Lafayette, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 100 days.

(21) Appl. No.: 11/351,179

(22) Filed: Feb. 9, 2006

(65) Prior Publication Data

US 2006/0126255 A1 Jun. 15, 2006

Related U.S. Application Data

(62) Division of application No. 09/748,720, filed on Dec. 26, 2000.

(51) Int. Cl.
*H02H 1/00* (2006.01)
(52) U.S. Cl. ....................... 361/118; 361/117
(58) Field of Classification Search ................. 361/103, 361/91.1, 111, 117–120; 324/110; 702/61
See application file for complete search history.

(56) References Cited

U.S. PATENT DOCUMENTS

| | | | |
|---|---|---|---|
| 3,600,634 A | 8/1971 | Muench | |
| 4,181,872 A | 1/1980 | Chermin | |
| 4,389,695 A | 6/1983 | Carpenter, Jr. | |
| 4,586,104 A | 4/1986 | Standler | |
| 4,630,163 A * | 12/1986 | Cooper et al. ................. | 361/56 |
| 4,740,859 A * | 4/1988 | Little ........................... | 361/56 |
| 4,930,047 A | 5/1990 | Peterson | |
| 5,115,368 A | 5/1992 | Smith | |
| 5,379,176 A * | 1/1995 | Bacon et al. ................. | 361/106 |
| 5,384,429 A | 1/1995 | Bulson et al. | |
| 5,513,059 A | 4/1996 | Atkins | |
| 5,802,170 A | 9/1998 | Smith et al. | |
| 5,909,168 A | 6/1999 | Miyasaka et al. | |
| 5,953,194 A * | 9/1999 | Atkins ........................ | 361/119 |
| 5,986,870 A | 11/1999 | Kapp | |
| 6,018,452 A * | 1/2000 | Meyerhoefer et al. ....... | 361/111 |
| 6,040,971 A | 3/2000 | Martenson et al. | |
| 6,072,679 A | 6/2000 | Myong | |
| 6,094,129 A * | 7/2000 | Baiatu ....................... | 338/22 R |
| 6,097,246 A * | 8/2000 | Tsurunaga et al. .......... | 327/599 |
| 6,122,157 A | 9/2000 | Gerlach | |
| 6,266,223 B1 | 7/2001 | Curry | |
| 6,282,073 B1 * | 8/2001 | Glaser et al. ................ | 361/104 |
| 6,356,424 B1 | 3/2002 | Myong et al. | |
| 6,373,347 B1 | 4/2002 | Cogan | |
| 6,411,486 B1 * | 6/2002 | Doneghue ................... | 361/118 |
| 6,480,604 B1 | 11/2002 | Chandran | |

\* cited by examiner

*Primary Examiner*—Danny Nguyen
(74) *Attorney, Agent, or Firm*—Maginot, Moore & Beck

(57) ABSTRACT

An electrical meter includes a voltage input, a current input, a measurement device and a surge protection apparatus. The measurement device generates electrical power consumption measurements based upon the voltage input and the current input. The surge protection apparatus may include an inductor, a resistor and a positive temperature coefficient device (PPTC). A protective barrier is provided to physically isolate the surge protection apparatus from other components of the meter.

11 Claims, 4 Drawing Sheets

EXCESSIVE SURGE PROTECTION METHOD AND APPARATUS

This application is a divisional of, and claims the benefit of, prior application Ser. No. 09/748,720, filed Dec. 26, 2000.

FIELD OF THE INVENTION

The invention relates generally to surge protection for electrical circuits susceptible to occasional periods of electrical current surges, and more particularly to a protection method and device for reducing the magnitude of surge currents and associated power follow through that can occur for an excessively large voltage surge.

BACKGROUND OF THE INVENTION

Surge protection devices are conventionally designed for protecting circuitry from overvoltage surges. One type of conventional device provides temporary surge protection by shunting the overvoltage surge to ground or neutral. A prolonged overvoltage surge may cause such a surge protection device to overheat. An event of overheating can result in increased temperatures that can be above the combustion temperatures of nearby materials, causing burning of the materials. The excessive overvoltage can also result in arcing of the voltage across terminals in the circuitry, a condition which can rapidly result in unpredictable modes of damage.

A second type of surge protection device is connected in series between a voltage source and an active load. There is a problem that an overvoltage surge due to an excessively large voltage occurring across the terminals of the series-connected surge protection device may cause the surge protection device to suffer catastrophic failure. Flying debris from such a failure can facilitate arcing, resulting in subsequent damage of an unpredictable nature. For example, the arcing can cause melting of components and carbonization of the surfaces of the components, especially a printed wiring board surface. The carbonization can create additional current paths that can add to a destructive condition. Thus, it can be seen that catastrophic damage to an equipment installation, building, or occupants of a building can occur as a result of the excessive overvoltage.

One conventional method of reducing the risk of catastrophic damage is to enclose the components of a surge protector with a combustion-resistant material, such as dry electrical-grade silica. The dry electrical-grade silica displaces the air (which contains oxygen) within the cavity, reducing a risk of combustion, and also provides thermal capacitance to absorb the heat generated by the transient voltage spike, thus protecting adjacent equipment, even if the surge protection device is destroyed. However, prolonged heating and subsequent failure of the enclosure, even when it is filled with dry electrical-grade silica, causes a risk of fires. Although the 'prolonged surge' type of device may be improved to reduce a risk of heat and combustion, this conventional device using dry electrical-grade silica cannot prevent a catastrophic failure due to arcing caused by excessive voltage surges, especially not when the arcing occurs at input terminals of a power meter.

For a three-phase 480 volt service, an overvoltage surge can reach 10,000 to 20,000 volts or more. Such voltages cause different types of arcing depending upon the magnitude of the voltage, and depending upon variation in the properties of the several components in the surge protection circuit, including variation in adjacent materials and conditions. Thus, there is a problem in determining a location where arcing and catastrophic damage may occur.

More specifically, there is a problem that, for excessive overvoltage surges at the input terminals of an electric utility power meter, a mode of failure is unpredictable because arcing can occur due to a number of factors such as loose connections, wiring defects, stray current paths, and component failure, as well as being due to various conditions of the excessive voltage signal itself. The problem of unpredictability of a failure mode is compounded for an electric utility power meter, which is necessarily enclosed under the cover of the meter enclosure.

As discussed above, various types of surge protectors are well known. Surge protection devices generally have a nominal relatively high electrical impedance, which, upon being subjected to a voltage of sufficiently high magnitude, changes to a significantly lower impedance and conducts electrical current relatively readily. The various types of surge protection devices include varistors, silicon avalanche diodes, zener diodes, selenium cells, gas discharge tubes, and high voltage capacitors. Metal oxide varistors (MOVs) are used for many low voltage applications, with operating voltages of about six hundred volts AC (600 VAC) or less.

FIG. 1 illustrates a first conventional type of surge protection device, having a current limiting resistor 4, a metal oxide varistor (MOV) 5, and a polymeric positive temperature coefficient device (PPTC) 3, all disposed on a printed wiring board 1. The current limiting resistor 4 is coupled in series between a voltage source and the load 6 and the MOV 5 is coupled across the load 6 to ground. The MOV 5 acts to limit the voltage applied to the load 6. The current limiting resistor 4 serves to limit the maximum surge current through the MOV 5. The PPTC 3 limits the steady state current through the current limiting resistor 4 in order to prevent the resistor 4 from overheating. While the above device in FIG. 1 has some utility, it is limited the types of voltage sources to which it can be connected. Specifically, manufacturers of PPTC devices do not recommend a use of PPTC devices in a direct series connection with a utility power line as shown in FIG. 1. Moreover, excessively large currents such as those resulting from an overvoltage can cause destruction of the PPTC. As discussed above, such destruction can result in secondary arcing and unpredictable damage modes.

FIG. 2 illustrates a typical surge protection device used in a relatively high voltage device that is connected to a utility power line. In particular, the high voltage device is in an electrical utility meter. The conventional utility meter circuit connects the current limiting resistor 4 directly in series with the power line connection, voltage source 2. However, such a surge device can fail under certain conditions of excessive surge voltage, potentially resulting in secondary arcing as described further above. If a phase-to-phase or phase-to-neutral arc occurs, then the severity of the failure is unpredictable.

The conventional surge protection devices do not contain any protection for an arcing condition that may damage the protection device itself. There is a need for a surge protection device that inhibits catastrophic failure of the surge protector and otherwise provides a predictable failure mode.

SUMMARY OF THE INVENTION

It is an object of the present invention to provide a predictable mode of failure in loads, for example, electricity meters, that are connected to a utility power line and for which a risk of phase-to-neutral or phase-to-phase voltage arcs exist.

Another object of the present invention is to reduce the severity of failures caused by a phase-to-neutral or phase-to-phase fault.

In order to prevent the undesirable effects of arcing across power connections to a load coupled to a utility power line, a surge protection circuit according to the invention employs a breakdown device such as an inductor or PPTC and a protective barrier that is configured to isolate the breakdown device from the load. The isolation allows for the catastrophic failure of the breakdown device without distributing debris into the area of the load circuit. The catastrophic failure of the breakdown device typically opens the line between the utility power line and the load, thereby inhibiting prolonged arcs. The suppression of debris reduces the risk of additional arcing and physical damage.

Variations of the surge protection device include a circuit that employs a resistor, a PPTC and an inductor. Such devices may not require a protective barrier because the various devices cooperate to reduce the chance of catastrophic failure in the event of an extended voltage surge.

In one embodiment of the present invention a surge protection apparatus connected between an electrical power line source and a load includes a voltage input, an inductor, and a protective barrier. The voltage input is coupled to the electrical power line. The inductor is coupled between the voltage input and the load. The protective barrier is interposed between the inductor and the load, and is configured to physically isolate the inductor from the load.

The surge protection device solves conventional problems associated with occurrences of unpredictable failure modes and failure results, generally in applications where an electric utility meter is directly attached to 480 volt service lines. The surge protection device, however, also improves the response of any load connected to a utility power line to an excessive voltage surge in that utility power line.

In another embodiment of the present invention, an electricity meter includes voltage and current inputs, a measurement device, and a surge protection circuit. The voltage input is coupled to an electrical power line. The current input is coupled to obtain current measurement information from the electrical power line. The measurement device is operably connected to receive measurement signals from the voltage input and the current input, and is operable to generate electrical power consumption measurements from the measurement signals. The surge protection apparatus circuit includes at least one breakdown element and a protective barrier. The at least one breakdown element is coupled between the voltage input and the measurement device. The protective barrier is configured to physically isolate the at least one breakdown element from the measurement device.

These and other features of the present invention will be apparent to those of ordinary skill in the art in view of the description of specific embodiments, made with reference to the drawing figures, a brief description of which is now provided.

DETAILED DESCRIPTION

Figure 3:
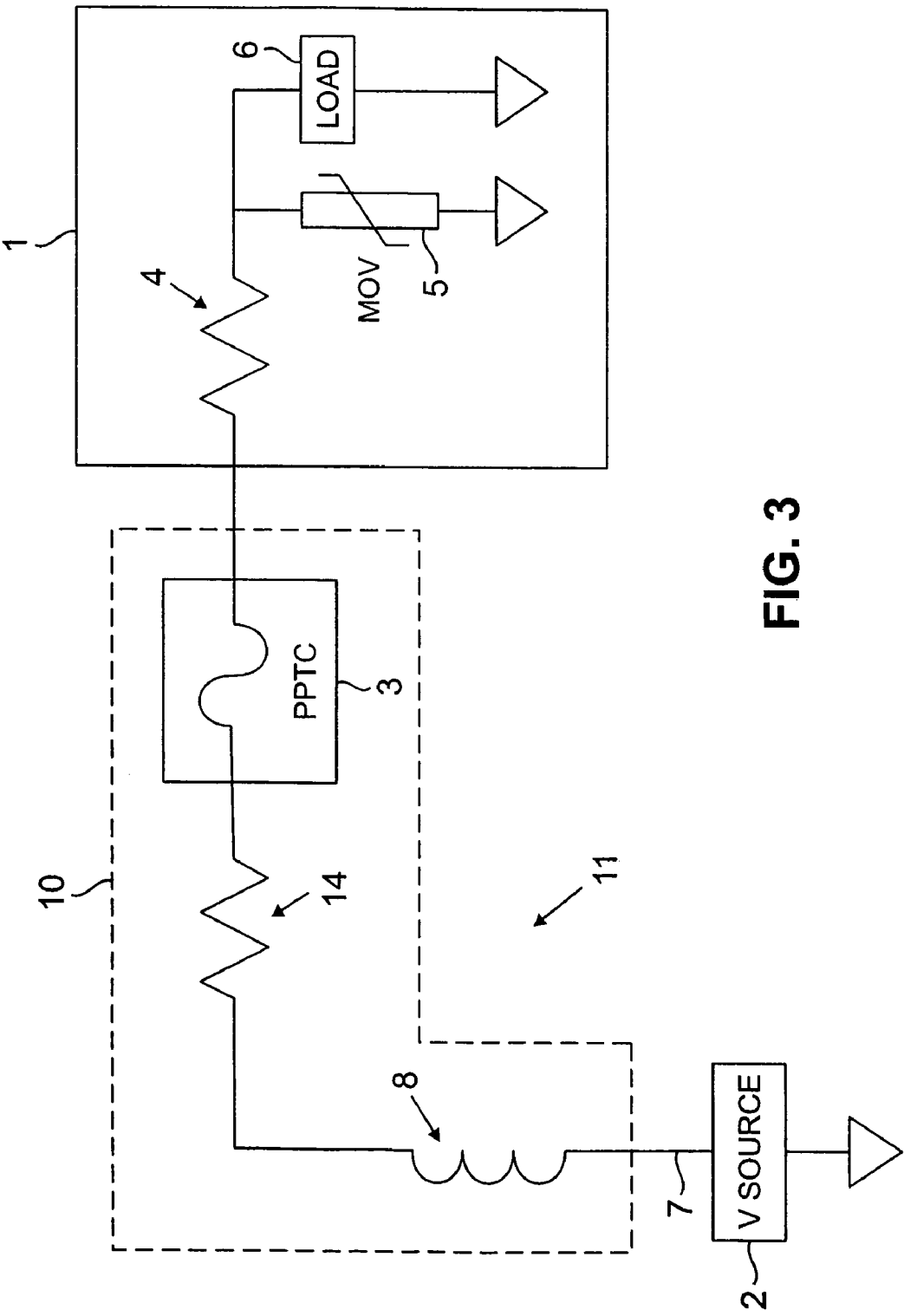
FIG. 3 is a schematic diagram of an embodiment of a surge protection apparatus according to the present invention.

FIG. 3 shows an exemplary embodiment of a surge protection device 11 according to the present invention that includes a circuit composed of three components connected in series. The surge protection device 11 includes a voltage input 7 connected to the voltage source 2, which is a utility power line. An inductor 8 is series connected between the voltage input 7 and a resistor 14. The other end of resistor 14 is connected to a first end of a PPTC 3. The other end of the PPTC 3 is connected to a resistor 4 that is part of a surge protection circuit mounted on printed wiring board 1. The other end of resistor 4 is connected to an MOV 5 that is disposed in parallel with the load 6. The voltage source 2, MOV 5, and the load 6 are each connected to a common ground at their respective other ends.

The voltage input 7 may suitably be an input of any circuit (load 6) that is coupled to an electrical utility power line. Electrical utility power lines have AC voltage levels that may be 120 volts, 240 volts, 480 volts, as well as other levels. In the context of a 480 volt AC utility power line, potential overvoltages have been reported at up to 20000 volts. The exemplary embodiment described herein is configured to accommodate overvoltages of this magnitude, as well as lesser magnitude overvoltages.

The PPTC 3 is a polymeric positive temperature coefficient device used as a resettable fuse. Such devices have the characteristic that they stop conducting as their temperature exceeds a threshold. The device characteristics are such that below the PPTC's pass current level, the PPTC operates as a resistor of nominal resistance. However, in excess of its specified threshold current, its temperature increases to a point in which its resistance increases. If the current remains above the PPTC's threshold, the PPTC will trip and behave as an open circuit. The trip time decreases as the current increases. Suitable PPTC devices include the available from Raychem Corp. of Menlo Park, Calif. In the exemplary embodiment described herein, the PPTC 3 has a 145 milliampere maximum pass current, and by way of example, has a trip-time current curve such that it will trip in 10 seconds if the current is 400 milliampere and in 0.45 seconds if the current is 1 ampere.

The resistor 14 may suitably be a wire wound, axial lead type resistor. The resistor 14 is selected to assure that the minimum resistance does not drop below a threshold necessary to limit surge current, and subsequent power follow through, to a maximum current amount. Typical values for the resistor 14 are 50 ohms, 20 ohms, or 10 ohms. In a preferred embodiment, the resistor 14 is a 50 ohm, 4 watt resistor. The use of an axial lead resistor reduces the possibility of a sustained arc in the event of a failure of the resistor.

The inductor 8 is used to prevent short duration current spikes from appearing at the PPTC 3 as well as the printed wiring board 1. The prevention of short duration current spikes reduces the possibility that a transient overvoltage will damage portions of the load 6 or the PPTC 3. In the exemplary embodiment described herein, the inductor 8 is a 100 microhenry inductor having a dc resistance of 3.2 ohms. The inductor 8 should be chosen such that it suppresses transient currents for a sufficient time to let the PPTC 3 begin to restrict the current for at least some overvoltage levels within the range of expected overvoltages. The purpose of preventing high impulse currents from reaching the PPTC 3 is to prolong the life of the PPTC 3.

It is recognized that size constraints can limit the inductor that is used. Those of ordinary skill in the art may readily select an appropriate inductor to suit their current suppression and size constraints.

The surge protection device 111 preferably further includes a protective barrier 10 that separates or isolates the inductor 8, resistor 14, and PPTC 3 from the load 6. The protective barrier 10 may take infinitely various forms, but basically includes a wall, sleeve or compartment constructed of inflammable material, such as, for example, certain plastics.

The load 6 will typically include a housing, not shown, that may incorporate such a barrier, or in which such a barrier may be defined. For example, in U.S. Pat. No. 5,933,004, which is incorporated herein by reference, a utility meter is shown in that includes a load circuit board (element 34 of that patent) and an electrically safe interface (element 26). In such an embodiment, by placing the inductor 8, resistor 14 and the PPTC 3 on the opposite side of the electrically safe interface from the load circuit board, the electrically safe interface serves as the protective barrier 10 according to the present invention.

Alternatively, the protective barrier 10 may comprise a protective sleeve constructed out of a shrink tube or shrink packaging element that largely surrounds the inductor 8, resistor 14, and the PPTC 3. The protective sleeve can be formed from any suitable electrical insulator such as PTFE or plastic.

In general, the protective barrier 10 must resist combustion and must inhibit flying debris that may occur upon the failure of any or all of the inductor 8, resistor 14, and PPTC 3 from reaching the load 6 to prevent such debris from causing secondary arcing between components and/or connectors in the load 6 (i.e. on the circuit board 1). Those of ordinary skill in the art may readily define their own protective barrier 10 to suit the construction and housing of their particular load 6. For the purposes of the discussion herein, the load 6 is considered to include any elements on the printed circuit board 1 that pose a potential arcing hazard.

The protective barrier 10 provides a safeguard in the event of a catastrophic failure of any of the inductor 8, the resistor 14 and the PPTC 3. As discussed above, without the protective barrier 10, a catastrophic failure could result in emitted debris, which can initiate secondary arcing in the circuitry or contacts of the load 6. To facilitate containment of any such debris, the protective barrier 10 physically isolates the inductor 8, the resistor 14, and the PPTC from the load 6 (and/or other circuitry on the printed circuit board 1).

In normal operation, the voltage source 2 provides normal line voltages to the load 6 through the inductor 8, the resistor 14, the PPTC 3, and the resistor 4. In the event of an overvoltage that results, or attempts to result in an arc, the inductor 8 immediately acts to suppress high transient currents that could support an arc. In the event that overvoltage continues, the resistor 14 operates to limit the current available to support an arc. In addition, the temperature of the PPTC 3 increases as a result of the excessive current flow. If the surge voltage is too high, then the MOV 5 starts conducting to limit the applied voltage to the load 6.

In many cases, the operation of the PPTC 3 will sufficiently prevent any arcing until the overvoltage situation is over. Accordingly, the PPTC 3 operates as a resettable fuse. As a result, the surge protection device 11 does not necessary require replacement after each overvoltage event.

In other cases, the overvoltage may nevertheless create an arc. If an arc occurs, then the resistor 14, inductor 8, or PPTC 3 may rupture. Such rupture, however, stops excessive currents from being sustained by creating an open circuit. Any or all of the components may rupture due to the excessive current and thus create an open circuit. The protective barrier 10 inhibits and preferably prevents the debris from the destroyed component from contacting the circuitry of the load 6 or other elements.

A variation of the device 11 uses only the inductor 8 and PPTC 3 in series, removing the resistor 14. This embodiment is advantageous for applications where adding the resistor 14 would affect the operation of the load 6. For example, in an exemplary embodiment of the surge protection device employed within an electricity meter, addition of the resistor 14 could in some cases undesirably affect the meter's registration accuracy. Those of ordinary skill in the art may readily determine whether the added current limiting capabilities provided by addition of the resistor 14 outweigh any negative effect on the operation of the circuit of the load 6.

Another variation of the device 11 uses only an inductor 8 or PPTC device 3 separated by the protective barrier 10 from the load 6. Where a single breakdown device is used in the device 11, excessive currents are ultimately limited by a rupturing of the breakdown device. Otherwise, the breakdown device (inductor 8 or PPTC 3) provides the suppression capabilities discussed above in cases in which surge does not cause a rupture. For example, the PPTC 3 increases in resistance until it behaves as an open circuit. If the PPTC 3 thereafter ruptures, it opens the circuit and thus inhibits a sustained arc. The inductor 8 alone also operates in an analogous manner.

The PPTC 3 alone may be useful in environments in which fast transient surges are relatively rare and longer time constant, sustained surges are more prevalent. The inductor 8 alone may be useful in environments in which fast transient surges are common.

In yet another embodiment, the protections provided by the combinations of the PPTC 3 and the inductor 8 (with or without the resistor 14) may be sufficient without the protective barrier 10 if the elements are chosen to withstand the highest possible voltage surges. In any event, at least one aspect of the present invention relates to the protections provided by the combination of the inductor 8 and the PPTC 3 regardless of whether a protective barrier is present.

In the selection of the components 3, 8 and 14, the desired series impedance of the surge protection device 11, and the individual resistances, transient responses and impedances of the components 3, 8, and 14 must be considered. In addition, disconnect mechanisms (not shown) can be connected in series with the components 3, 8 and 14, the disconnect mechanisms operating as a back-up for creating an open circuit between the voltage input 7 and the load 6 in the event of a prolonged overvoltage surge. In conjunction with the disconnect mechanisms, visual indicators (not shown) may also be employed, so that a disconnected line can be quickly determined.

The present invention thus provides surge protection above and beyond that available from a simple MOV shunt. Although the configuration shown in FIG. 3 allows the full voltage to reach the printed circuit board 1, the circuit of the surge protection device 11 prevents high currents from damaging the circuit board 1 in part by using the series components as fusable devices. The PPTC 3 acts as a 'poly-fuse,' where the response time for opening the circuit is less than that required to induce rupture of the inductor 8 or the resistor 14.

The actual performance can be customized according to the individual components used. For example, an inductor may be selected that accommodates voltages having predetermined transient characteristics, a resistor can be selected that limits steady state currents for a particular period of time, and a PPTC can be selected according to its melting temperature. In this manner, the surge protection device can be configured to optimize protection for a particular likelihood or risk of a known or suspected condition. For example, the environment for a particular application may have a high or low humidity, have a differing power factor, be proximate to high inductance machinery, have a greater susceptibility to a certain transient condition, or have differing grades of electrical utility wiring. By controlling the location of a possible arcing, the magnitude and resultant damage from an excessive overvoltage condition can be controlled.

Figure 4:
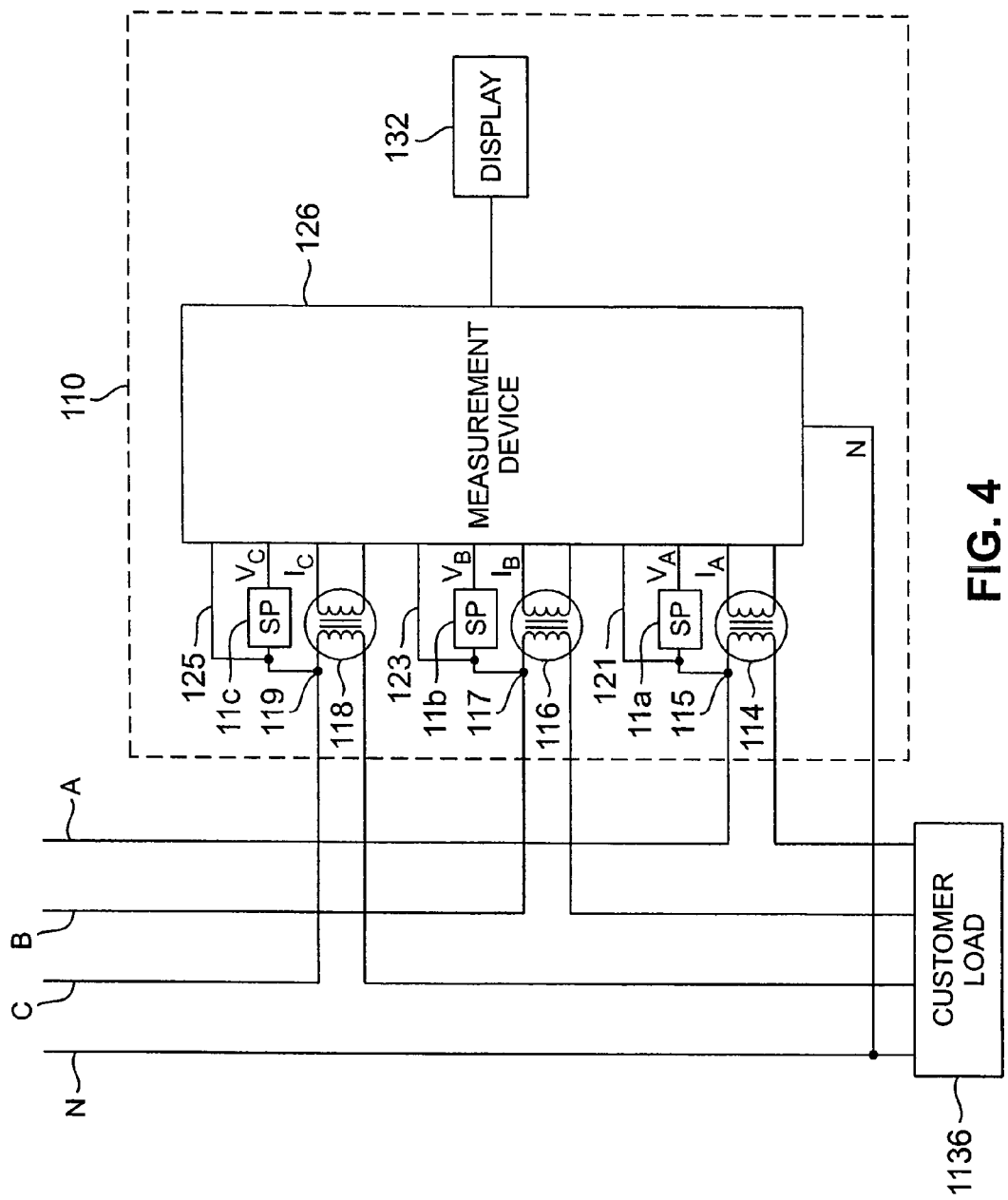
FIG. 4 is a schematic diagram of an embodiment of an electricity meter according to the invention that is provided with surge protection devices.

FIG. 4 shows a schematic block diagram of an exemplary electricity meter 110 that incorporates three surge protection devices 11a, 11b and 11c according to the present invention. The electricity meter 110 is shown in context installed in a three phase power system. The exemplary embodiment of the surge protection devices 11a, 11b and 11c described herein protects the meter circuitry, which is typically housed on one or more printed circuit boards, from unpredictable failure modes due to excessive overvoltages and associated power follow through generated on the connected utility lines.

The meter 110 includes a measurement device 126, three voltage inputs 115, 117, and 119, three current inputs 114, 116 and 118 and three surge protection circuits 11a, 11b and 11c.

The three voltage inputs 115, 117 and 119 are each coupled to a respective one of the three phase power lines A, B, and C, and are further connected to the measurement device through a respective one of the surge protection circuits 11a, 11b and 11c. In the exemplary embodiment described herein, the three voltage inputs 115, 117 and 119 are also connected directly to portions of the measurement device 126 through respective bypass lines 121, 123 and 125, for reasons discussed further below.

The three current inputs 114, 116 and 118 are configured to obtain current measurement information from each of the three phase power lines A, B, and C. In the exemplary embodiment described herein, each of the three current inputs 114, 116 and 118 includes a current transformer ("CT"). However, other methods of obtaining current measurement information are known to those of ordinary skill in the art.

While the electricity meter 110 in FIG. 4 is configured to measure a three phase, four wire wye service connection as is known in the art, it is be appreciated that those of ordinary skill in the art may readily modify the arrangement of FIG. 4 to accommodate a three wire delta, four wire delta, or other standard service connection types. The electricity meter 110 may also be readily modified for use in single phase service connections. In such a case, only a single surge protection device 11a would be necessary.

The surge protection devices 11a, 11b, and 11c may each comprise the surge protection device 11 of FIG. 3, including any alternatives described above in connection therewith. The measurement device 126 is a circuit or other device that is operably connected to receive voltage and current measurement signals from the voltage inputs 115, 117 and 119 and the current inputs 114, 116 and 118, respectively. The measurement device 126 is further operable to generate energy consumption information from the voltage and current measurement signals. Such devices are well known and may include, by way of example only, a processor-based circuit that calculates energy consumption data from digitized versions of the voltage and current measurement signals. Other devices may include a watt transducer or Hall Effect device that generates energy consumption information directly from analog measurement signals.

The exact form of the measurement device 126 is not relevant to the present invention. Any measurement device that requires relatively proximate connections between phase voltage inputs or between voltage inputs and ground will benefit from the surge protection device 11a, 11b, and 11c used in the meter of FIG. 4. An example of a suitable measurement device 126 is the measurement circuit (element 14) of U.S. patent application Ser. No. 09/258,536, filed Feb. 26, 1999, which is assigned to the assignee of the present invention and incorporated herein by reference.

Figure 1:
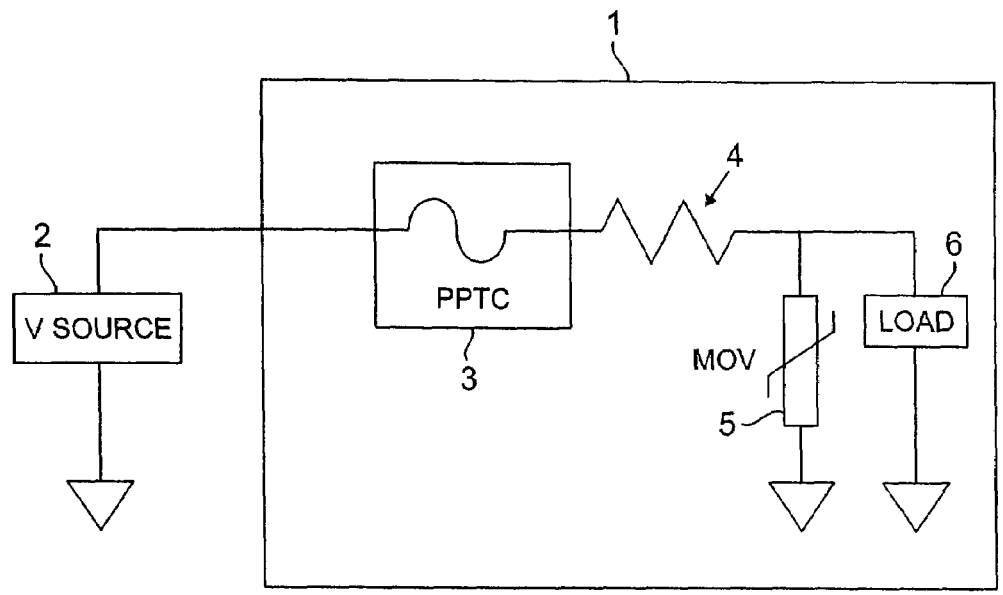
FIG. 1 is a schematic diagram of a first type of conventional surge protection apparatus.
Figure 2:
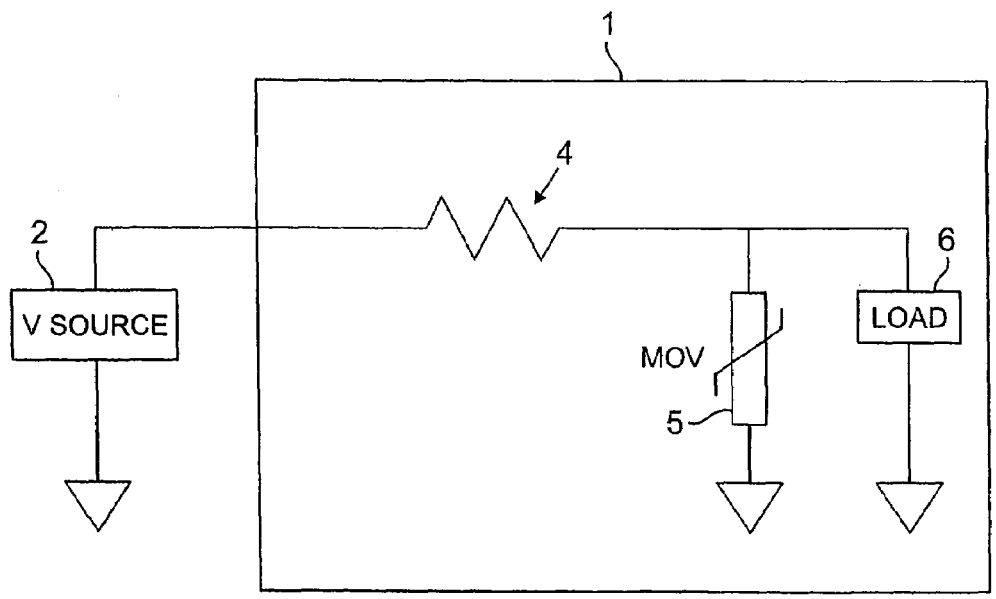
FIG. 2 is a schematic diagram of a second type of conventional surge protection apparatus.

It is noted that while some circuits in the measurement device 126 may particularly benefit from surge protection, other circuits may not. One particular circuit often found within measurement devices in utility meters that benefits from the surge protection device 11a, 11b, and 11c is a power supply. Many measurement devices in utility meters include a power supply to provide power to the various digital circuitries located therein. The power supply is typically coupled to one or more of the voltage inputs 115, 117 and 119. Such power supplies are likely to include a protection circuit such as the resistor 4 and MOV 5 as shown in FIGS. 1, 2, and 3.

Circuits that would not benefit greatly from the surge protection devices 11a, 11b, and 11c may be those that include high impedance input circuits. For example, voltage measurement circuitry within the measurement device 126 may include a 1000k-ohm input resistor. Such circuitry would not require the surge protection circuits 11a, 11b, and 11c. Indeed the surge protection circuits 11a, 11b, and 11c could create inaccuracies in the registration of the meter 110 if coupled between the voltage inputs 115, 117 and 119 and the voltage measurement circuitry. Accordingly, the meter 110 includes the surge protection circuit bypass lines 121, 123 and 125 as discussed above.

The bypass lines 121, 123 and 125 enable the measurement device 126 to have some circuits that obtain the protections of the surge protection circuits 11a, 11 b, and 11c, such as the power supply circuits, and some circuits that are directly connected to the voltage inputs 115, 117, and 119 because the surge protection circuits 11a, 11 b, and 11c could adversely affect their operation.

In any event, the surge protection devices 11a, 11b, and 11c are interposed between the voltage inputs 115, 117 and 119 and the measurement device 126 because otherwise the vulnerable portions of the measurement device 126 would be directly exposed to the surge voltages that from time to time occur on the utility power lines A, B, and C. The measurement device 126 is located in an enclosed space, and typically includes one or more circuit boards having connector pins, terminals, and traces, and lead wires, not shown. As a result, to the extent the utility power line voltage is received in the measurement device 126 without a large input resistor, such as is the case in the power supply circuitry of a digital meter, an arcing risk exists in the presence of unexpectedly high voltages.

It is noted that in some cases, a surge protection device 11 may only be required on a single phase voltage input of a polyphase meter such as the meter 110. One such case is one in which only the power supply of the measurement device 126 requires the surge protection device, and the power supply derives power from a single utility power line phase.

The meter 110 also preferably includes a display 132 for displaying information representative of the energy consumption information. The meter 110 may of course include additional elements as a matter of design choice. For example, the meter 110 may include one or more external communication circuits. Likewise, the meter need not include a display 132, depending on the embodiment employed.

In general, the power lines A, B, and C and a neutral line N are operably coupled to provide three-phase power to from a utility service provider, not shown, to a customer 136. The current inputs 114, 116 and 118 include current instrument transformers that deliver reduced current signals from power lines to the measurement device 126. The voltage inputs 115, 117, and 119 deliver full voltage signals from the power lines to the measurement device 126. The measurement device 126 derives its operating power from at least one of the voltage signals. The measurement device 126 further generates energy consumption information from the reduced current signals and the voltage signals. To this end, measurement device 126 may perform one or more of the following operations, scaling the voltage and current signals, digitizing the voltage and current signals, multiplying the digital voltage and current signals, and summing the resulting products.

As discussed above, the surge protection devices 11a, 11b, and 11c do not significantly affect such normal metering operations. However, in the case of a voltage surge, the surge protection devices 11a, 11b, and 11c operate to reduce the current in the measurement device 126 to inhibit arcing and reduce the possibility of catastrophic failure of the meter 110. To this end, the surge protection devices 11a, 11b, and 11c may, but need not, cooperate with other components inherent to the measurement device 126.

In particular, from time to time a voltage surge occurs that can potentially damage the measurement device 126. Such a voltage surge could, unchecked, result in arcing between connections or pins in the measurement device 126 that are coupled to the voltage inputs 115, 117 and 119. The result is essentially a high voltage, high current short circuit. The arcing within the meter 110 can produce unpredictable modes of damage. However, the surge protection circuits 11a, 11b and 11c inhibit such arcing by operating as described above in connection with FIG. 3. In worst case situations, a high voltage surge may result in the destruction of one or more of the surge protection circuits, but will not result in a prolonged arc. As a result, the damage due to overvoltage on the utility power line is rendered predictable and tolerable.

Figure 5:
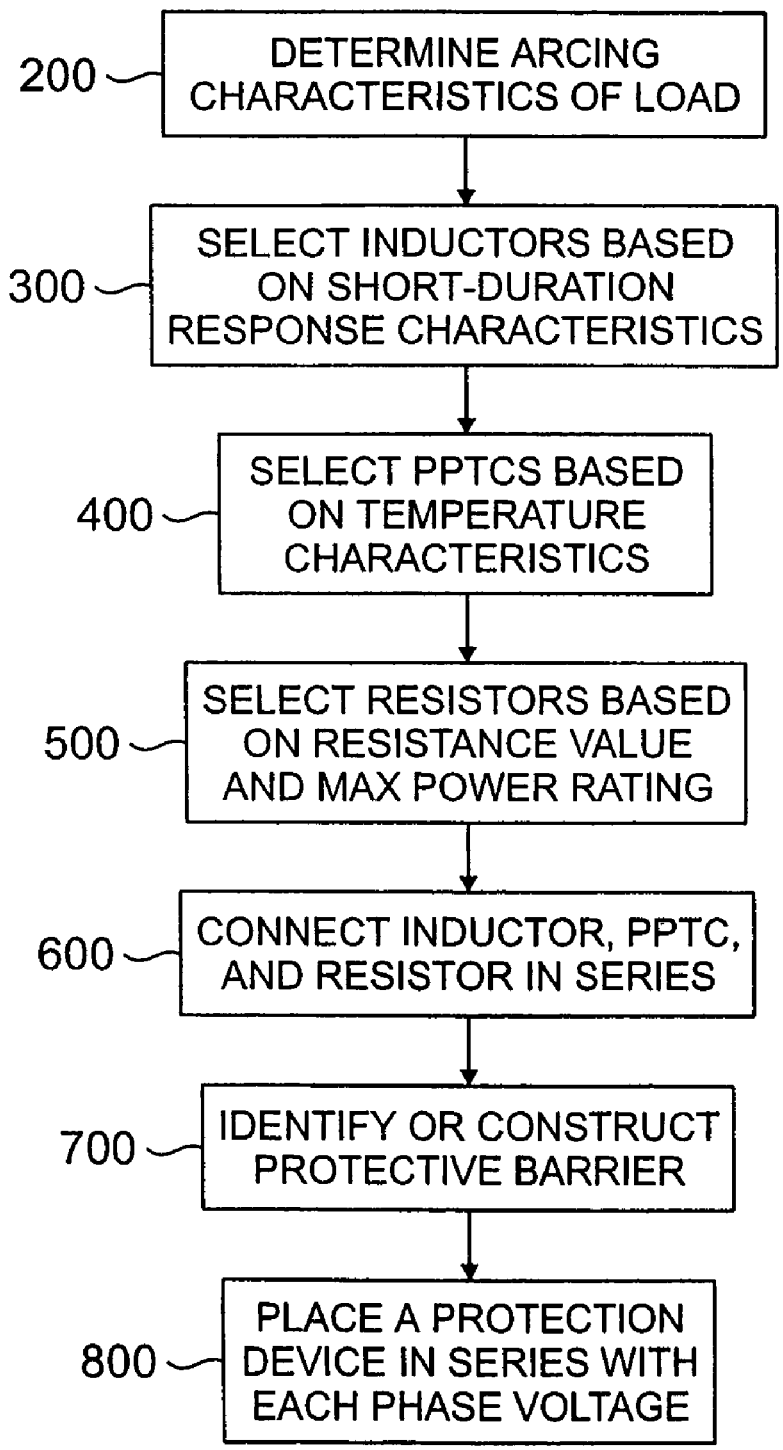
FIG. 5 is a flowchart for an exemplary method for protecting an electrical load connected to an electrical distribution system.

FIG. 5 is a flowchart showing an exemplary method of providing surge protection for a load. In this diagram, the surge protection device 11 of FIG. 3 is configured for the meter 110 of FIG. 4. It is presumed that at least a portion of the measurement device 126 is located on a printed circuit board or otherwise includes terminals that present arcing possibilities.

At step 200, the arcing characteristic of the load 6 (i.e. the measurement device 126) are considered. Where the range of a potential voltage surge is known, the terminals of the electricity meter's printed circuit board (on which the measurement device 126 or a portion thereof is located) can be evaluated for their arc resistance properties. However, a known safe value is used to characterize a protection level, to guarantee that the surge protection device 11 prevents any arcing from occurring within the meter assembly 110.

At step 300, the inductor 8 is chosen to have appropriate transient response characteristics as discussed above in connection with FIG. 3. To this end, it is desirable to prevent short duration spikes from appearing in the measurement device 126. However, the inductor 8 may be chosen (or even omitted) with the consideration that meter circuitry within the measurement device may include some transient suppression, such as the MOV 5 of FIG. 3. The inductor 8 may also be chosen at step 300 to store a voltage up to a certain point and to then be susceptible to rupturing from an excess power level.

At step 400, PPTCs 3 are chosen based upon their temperature or current rating which allows the PPTC 3 to rupture at a known excess current level. Resistors 14 are chosen at step 500 to provide a predicted current limiting under surge conditions. The resistors' 14 power rating may be chosen such that the resistors 14 rupture when the excess current reaches a potentially damaging level.

The three breakdown devices 3, 8, 14 are then connected together in series at step 600, the order of the components in the series circuit being variable so that mechanical placement and temperature dissipation, and other considerations are accounted for.

A protective barrier 10 is then identified in step 700 that will be interposed between the series circuit and the load 6. In some cases the protective barrier 10 must be formed. In others, a particular configuration of the load 6 give rise to an inherent structure that operates as a protective barrier that isolates the series circuit from the load.

The surge protection device 11 is installed in the electrical distribution system by placing the device 11 in series with each phase voltage input at step 800. Optionally, the surge protection device may be placed in series with a ground conductor (not shown), if a separate ground leg is used.

Any number of alternative embodiments and modifications are envisaged and will be apparent to those skilled in the art in view of the present disclosure. It is understood that the invention is not limited by the exemplary embodiments described herein. The description only serves to illustrate a best mode of carrying out the invention. Therefore, the method and structure may be substantially modified without departing from the scope of the invention, which is only limited according to the appended claims.

What is claimed is:

1. An electricity meter for measuring electrical power consumed by a load, the electricity meter comprising:
   a voltage input coupled to an electrical power line;
   a current input operably coupled to the electrical power line;
   a measurement device operably connected to the voltage input and the current input, the measurement device operable to generate electrical power consumption measurements based upon the voltage and current in the electrical power line; and
   a surge protection apparatus, the surge protection apparatus including an inductor and a protective barrier, the inductor coupled between the voltage input and the measurement device, the protective barrier configured to physically isolate the inductor from the measurement device, the surge protection apparatus further comprising a polymeric positive temperature coefficient device (PPTC) coupled in series with the inductor between the voltage input and the measurement device, the protective barrier configured to physically isolate the PPTC from the measurement device;
   a resistor connected in series between the PPTC and the measurement device; and
   a metal oxide varistor (MOV) operably connected at a first end between the resistor and the measurement device and at a second end to ground.

2. The electricity meter of claim 1, wherein:
   the voltage input is operably coupled to a polyphase electrical power line; and
   the measurement device is operable to generate electrical power consumption measurements based upon the voltage and current in the polyphase electrical power line.

3. The electricity meter of claim 1, wherein the protective barrier comprises an electrically safe interface.

4. The electricity meter claim 1, wherein the protective barrier comprises a protective sleeve.

5. The electricity meter of claim 1, further comprising:
a meter connected in series between the surge protection circuit and the measurement device.

6. The electricity meter of claim 1, wherein:
the voltage input is operably coupled to a polyphase electrical power line; and
the current input is coupled to the polyphase electrical power line.

7. The electricity meter of claim 1, wherein the protective barrier is attached to the housing.

8. The electricity meter of claim 1, wherein the protective barrier is integrally formed with the housing.

9. The electricity meter of claim 1, wherein:
the voltage input is operable to be coupled to an AC electrical power line of at least about 120 volts; and
the current input is operable to be coupled to the AC electrical power line.

10. The electricity meter of claim 4, wherein:
the voltage input is operable to be coupled to a polyphase electrical power line; and
the current input is operable to be coupled to the polyphase electrical power line.

11. The electricity meter of claim 4, wherein:
the voltage input is operable to be coupled to an AC electrical power line of at least about 120 volts; and
the current input is operable to be coupled to the AC electrical power line.

* * * * *